United States Patent [19]

Huvers

[11] 4,218,827
[45] Aug. 26, 1980

[54] GYROSCOPIC AIMING METHOD AND SYSTEM FOR SUSPENSION SYSTEM THEREFOR

[75] Inventor: Marius E. Huvers, Ste-Therésè, Canada

[73] Assignee: Canadair Limited, Montreal, Canada

[21] Appl. No.: 36,147

[22] Filed: May 4, 1979

[51] Int. Cl.³ ............................................. G01C 19/36
[52] U.S. Cl. .................................. 33/318; 33/275 G; 33/301; 73/1 E; 73/170 R
[58] Field of Search ............. 33/300, 301, 1 E, 275 G, 33/318, 324, 323, 1 R, 317, 411; 73/1 E, 189, 170 R; 9/8 R, 8 P

[56] References Cited

U.S. PATENT DOCUMENTS

| | | | |
|---|---|---|---|
| 3,010,214 | 11/1961 | Postlewaite | 33/301 |
| 3,121,954 | 2/1964 | Foster | 33/301 |
| 3,191,570 | 6/1965 | Henderson | 33/300 |
| 3,320,790 | 5/1967 | Gage | 73/1 E |
| 3,406,560 | 10/1968 | Michael | 73/1 E |
| 4,087,919 | 5/1978 | Huvers | 33/301 |

Primary Examiner—William D. Martin, Jr.
Attorney, Agent, or Firm—A. Lebrun

[57] ABSTRACT

A gyroscopic azimuth aiming concept adapted to aim a navigable body such as a drone or missile before its launching and defining an aiming method and system, and a suspension system to pendulously and removably suspend a gyroscope unit from the navigable body such that the gyroscope unit is isolated against pitch and roll displacements to be sensitive only to azimuth deviation of the navigable body. The aiming system and suspension system include a suspension assembly having an upper end removably connectable to the navigable body, a lower end, cables pendulously suspending the lower end from the upper end, and an anchoring base with an upright pivot to laterally restrain the lower end while allowing horizontal pendulous rotation and pivoting thereof, and a gyroscope unit is pendulously suspended to the lower end and its input axis is approximately aligned in the East direction to measure its azimuth deviation from the East direction by the effect of the earth rotation thereon.

19 Claims, 4 Drawing Figures

GYROSCOPIC AIMING METHOD AND SYSTEM FOR SUSPENSION SYSTEM THEREFOR

FIELD OF THE INVENTION

This invention relates to gyroscopic aiming of a navigable body such as a drone, missile, or the like and more particularly to a method and system of the type adapted for gyroscopic aiming of a navigable body before departure or launching thereof for a mission.

DESCRIPTION OF THE PRIOR ART

It has so far been a common practice to aim such navigable body by first marking a reference bearing on the ground at a launch site. This is done by conventional surveying. The navigable body is thereafter aimed in the right azimuth direction with an optical sighting instrument using the reference marking on the ground. There are also magnetic, astronomical, and gyro compass methods to effect the desired azimuth alignment but none of them is found satisfactory or convenient.

The Applicant in his U.S. Pat. No. 4,087,919 defines a method and a device to effect gyroscopic aiming rather than optical aiming and thus avoids the inherent disadvantages of the latter and of the other previously known methods.

It has been noted that in certain circumstances, the navigable body is subjected to gusts of wind and/or vibrations which produce deviations affecting the measurement of the aiming deviation itself.

SUMMARY OF THE INVENTION

It is a general object of the present invention to provide gyroscopic aiming which obviates the aforementioned disadvantages of the preceding aiming methods and systems.

It is a more specific of the present invention to provide a gyroscopic aiming method and system of the above type which is particularly adapted to avoid the disadvantages of the aforementioned aiming by surveying and optical sighting.

It is another more specific object of the present invention to provide an alternative gyroscopic aiming concept compared to the aiming concept defined in Applicant's U.S. Pat. No. 4,087,919.

It is a specific object of the present invention to provide a gyroscopic aiming system and method and a suspension system which is particularly adapted to isolate the gyroscopic unit against unwanted displacements to effectively discriminate between the fixed deviation and the transient deviation of the aiming direction relative to the desired aiming direction.

The present invention defined a new concept to effect gyroscopic aiming of a navigable body such as a drone; which concept involves an aiming method and system and a suspension system to pendulously and removably suspend a gyroscope unit from the navigable body such that the gyroscope unit is isolated against pitch and roll displacements to be sensitive only to azimuth deviation of the navigable body relative to the East direction in which the input axis of the gyroscope is pointing.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings; in which.

DESCRIPTION OF THE PREFERRED EMBODIMENT

Figure 1:
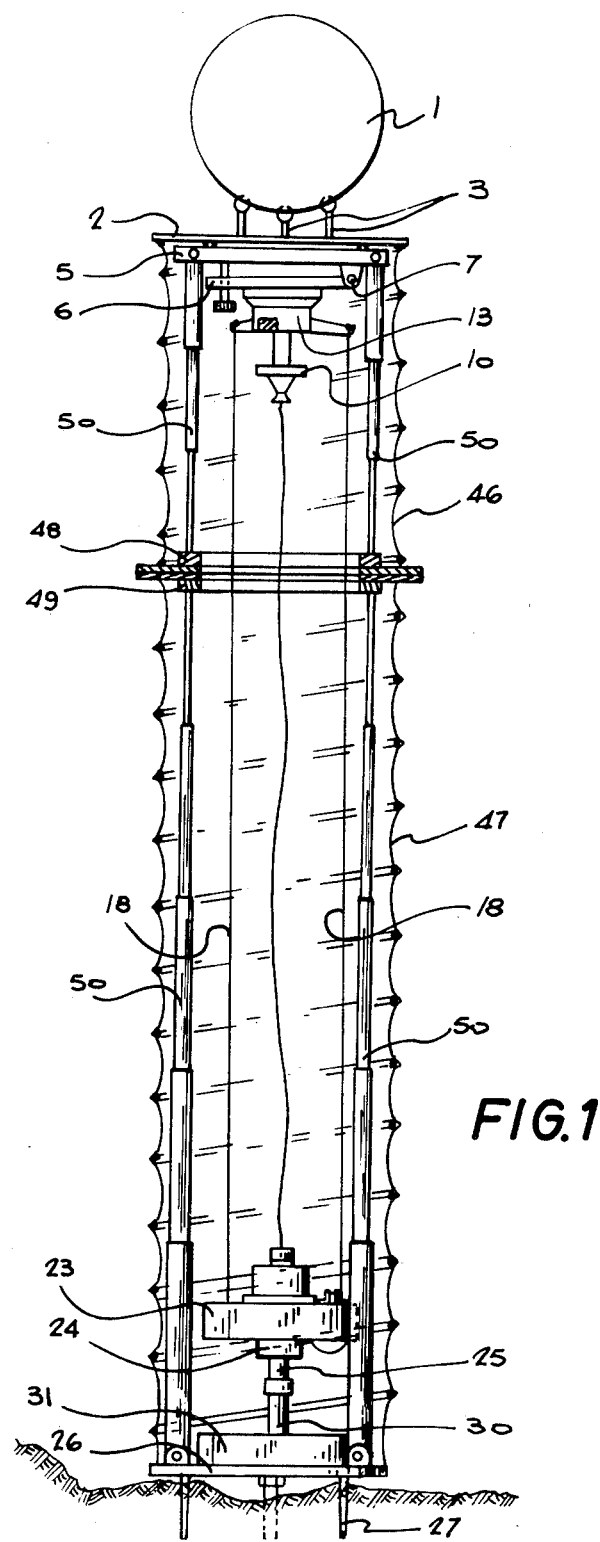
FIG. 1 is an elevation view of a gyroscopic aiming system according to the present invention operatively connected under a drone.
Figure 2:
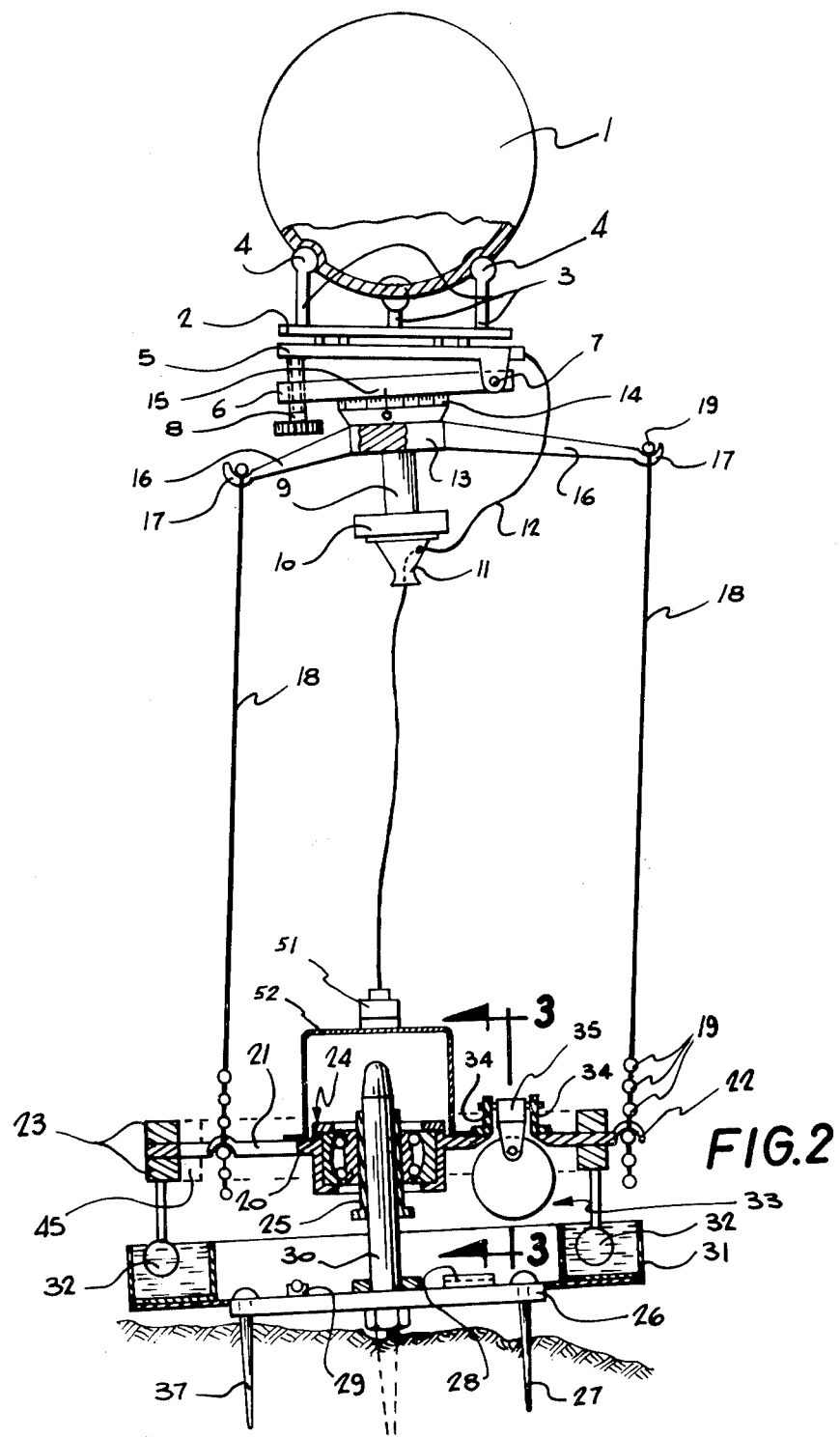
FIG. 2 is an elevation view as in FIG. 1 on a larger scale, with parts broken away and other parts in cross section to better define the structural details.

The illustrated gyroscopic aiming system is adapted to be removably suspended to a navigable body such as a drone, missile or the like which is schematically shown in cross section by the circular body 1 in FIGS. 1 and 2.

The gyroscopic aiming system includes an upper platform 2 on which are fixedly secured a set of three links 3 upwardly projecting therefrom. Each link 3 has an upper end 4 adapted to upwardly engage the drone 1 and to plug therein such as schematically shown in the drawings by a ball and socket connection. Such plugging must allow for positive suspension of a major portion of the gyroscopic aiming system to the drone upon use of the system. The links 3 in cooperation with the upper platform 2 thus form a suspension device to carry the ancillary parts. The links 3 are triangularly positioned relative to the bottom surface of the drone 1 at specific points of the latter.

A level platform assembly is carried by the links 3 and includes an intermediate platform 5 and a level reference bottom platform 6. The intermediate platform 5 is pivoted to the upper platform 2 about a transverse axis and the level reference platform 6 is pivoted at 7 to the platform 5 about a longitudinal axis. These axes are defined relative to the navigable body or drone 1. On the platform 6, there are mounted appropriate levels, not shown, to at least roughly set the level reference platform in level position both longitudinally and transversely relative to the drone. An adjustment screw 8 interconnects the intermediate and the lower platforms 5 and 6 while a similar screw, not shown, interconnects the upper and the intermediate platforms to adjustably pivot each underlying platform 5 and 6 and support the same in adjusted position relative to the platform to which it is pivotally suspended.

A round shaft member 9 projects endwise from the bottom of the level reference platform 6. A magnetic compass 10 is secured to shaft member 9 to bodily rotate therewith and thus with the drone 1 when the latter moves relative to the azimuth. A funnel shape device 11 is secured to the lower end of the shaft member 9 and forms a guide for a power supply and signal cable 12 which is fed from the launcher vehicle, not shown, on which the drone is usually mounted for launching.

A suspension assembly is connected to rotate around the round shaft 9 and be suspended to the level reference platform 6. This suspension assembly includes a three-legged upper member 13 which rotates on the round shaft 9 and is provided with a scale 14 around it. The scale 14 is used in cooperation with a reference mark 15, as shown, which is indicated on the platform 6 in alignment with the longitudinal axis of the drone 1.

The upper member 13 is connected to be finely adjusted angularly relative to the level reference platform 6 such as by a ball arranged to sit in any one of a plurality of cavities angularly spaced apart around the shaft member 9 with a fine angular spacing relationship, as is known in the art of precision instruments. The three legs 16 of the upper member 13 are spaced 120° apart one from another in azimuth and are each formed with a cup-shaped and longitudinally slotted fork end 17.

A set of three cables 18 hang from the cup-shaped ends 17 respectively. For that purpose, each cable 18 has one end provided with a ball 19 thereon which is swaged or otherwise firmly secured thereto.

The aforementioned suspension assembly includes a three-legged lower member 20 also with each leg 21 thereof spaced 120° apart from one another in azimuth and each formed with a cup-shaped and longitudinally slotted fork end 22. Each slotted fork end 22 has its concave side facing downwardly; that is, in opposite direction relative to the cup-shaped ends 17 of the upper suspension member 13. Each cable 18 has a plurality of balls 19 secured along the lower end thereof such that lower member 20 may be adjustably suspended in height by selective engagement of one or another of the balls 19 of the cables 18 in the cup-shaped ends 22 respectively.

A heavy ring 23 is secured on the legs 21 to heavily and pendulously suspend the lower suspension member 20. The latter is provided with a spherical central bearing 24 whose inner race is fixed on a sleeve 25 for bodily displacement therewith.

The gyroscopic aiming system also includes an anchoring base comprising a baseplate 26 anchored on the ground by means of spikes 27. The baseplate 26 is to be levelled such as by a pair of gas bubble levels 28 and 29. A post 30 is rigidly fixed to the baseplate 26 and upwardly projects endwise therefrom. The post 30 is well polished for substantially frictionless sliding of the lubricated sleeve 25 up and down along it. The pendulously suspended lower member 20 is to be damped against rotation by any appropriate means which is shown in FIG. 2 as an annular oil container 31 with circular damping blades 32 immersed therein and downwardly suspended from the annular ballast ring 23.

Figure 3:
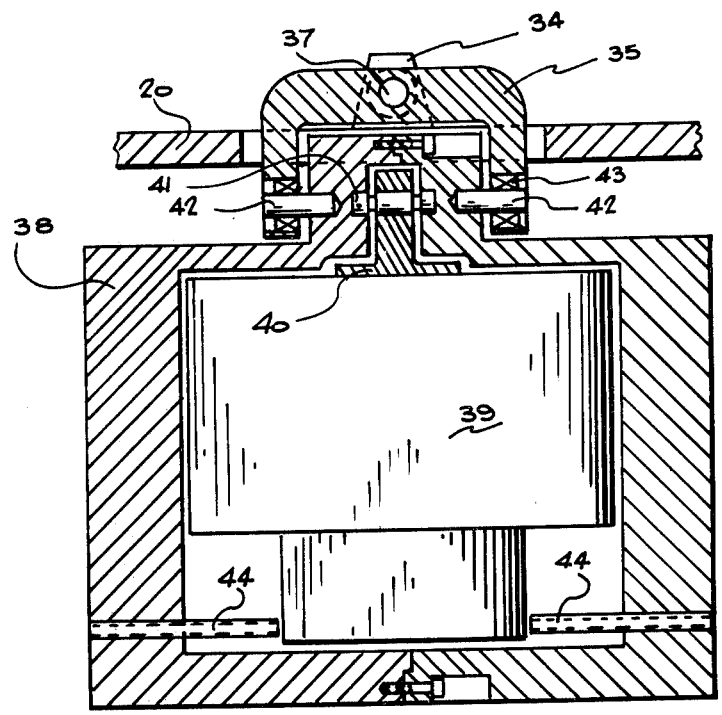
FIG. 3 is a cross-sectional view as seen along line 3—3 in FIG. 2.
Figure 4:
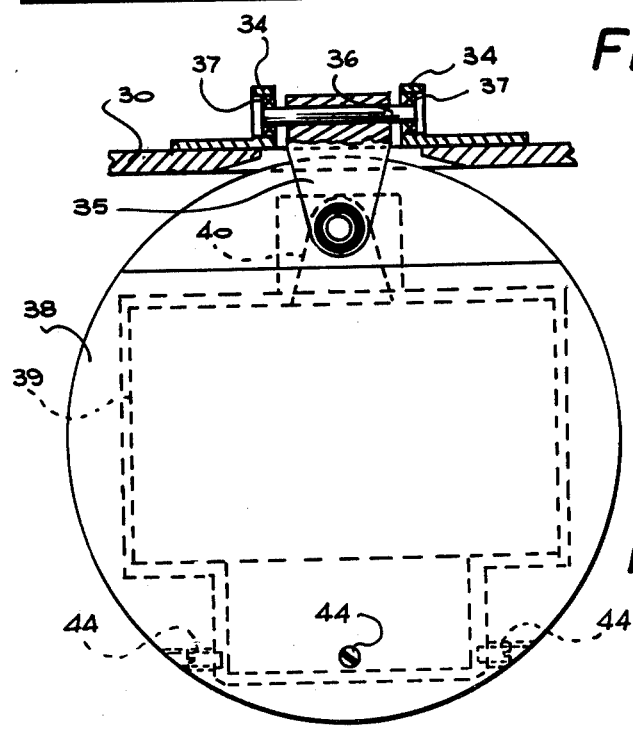
FIG. 4 is an end view as seen from either the left or the right in FIG. 3 and with a first pivotal connection shown in cross section.

A gyroscopic assembly 33 is pendulously suspended from the lower suspension member 20 as best shown in details in FIGS. 3 and 4. The gyroscopic assembly registers with an appropriate aperture in the lower suspension member 20 to allow the necessary freedom of pivotal motion thereto. A pair of brackets 34 are fixedly secured on the lower member 20 on the opposite sides respectively of its aforementioned aperture. The gyroscopic assembly includes a V-shaped member 35 which is pivoted into the brackets 34 by a pivot 36 fixedly secured in the member 35 and rotatively mounted in high precision bearings 37 in the brackets 34 respectively. The gyroscopic assembly also includes a massive or ballasted body 38 forming a housing defining an internal chamber for a gyroscope unit 39. The internal chamber is filled with a damping fluid and the pendulosity periods of body 38 and the gyroscopic unit 39 are made to be substantially different. This produces an internal damping for the body 38 as well as for the gyroscopic unit 39. A bracket 40 is fixed on top of the housing of the gyroscope unit 39. The ballasted body 38 has an upper portion which defines a cavity into which the bracket 40 is pivotally mounted by a double flexural pivot 41 of the type sold by Bendix Corporation under the trademark FREE-FLEX. This upper portion of the body 38 is in turn pivotally connected to the V-shaped member 35 by a pair of aligned pivots 42 projecting from the opposite sides of the upper portion and rotatively engaged in high precision ball bearings 43. The flexural pivot 41 is aligned with the pivots 42 preferably level with the pivotal point of the spherical bearing 24. A set of adjustable screws 44 are threaded in the ballasted body or housing 38 with the inner end of each projecting into the internal chamber of this housing and each closely spaced endwise from a corresponding side of the tuned gyroscope unit 39 to limit the pendulous pivoting thereof within the operative limits of the flexural pivot 41. A counterweight 45 of any appropriate type is secured to the ballast ring 31 diametrically opposite the gyroscopic assembly 33 to balance the weight of the lower supporting member 20 and the carried elements relative to the central pivot axis defined by the spherical bearing 24. Thus, when the lower supporting member 20 is inclined there is no weight unbalance tending to rotate this member toward static equilibrium thereof around its central axis.

A flexible tubular enclosure is provided to shield the suspension assembly and the gyroscopic assembly. This flexible tubular enclosure includes a pair of tube sections 46 and 47. The tube section 46 is fixedly secured at its upper end to the upper platform 2 and downwardly projects therefrom around the suspension assembly and level platform assembly. The tube section 47 is fixedly secured at its lower end to the anchoring baseplate 26 and upwardly projects therefrom around the lower suspension end of the suspension assembly. The lower end of the top tube section 46 and the upper end of the bottom tube section 47 have a pair of connection rings 48, 49 secured thereto respectively. The rings 48 and 49 have each a flange which is selectively securable to the flange of the other ring to selectively hold the tube sections deployed to cooperatively form the tubular enclosure. Each of these sections is of the type sold under the trademark Spiratube by Bendix Corporation. A set of telescopic posts 50 is mounted inside each tube section 46, 47 with each post being pivotally connected at its outer end to the upper platform 5 for the upper set and to the baseplate 26 for the lower set to laterally pivot in any lateral direction. The inner end of each telescopic post 50 is connected to the corresponding ring 48 or 49. Thus, even when the anchoring base is laterally offset relative to the level reference platform 6 and even if the drone is moved by gusts of wind, the rings 48 and 49 may be pulled and clamped into engagement with each other, as shown in FIG. 1 to cooperatively form the aforementioned tubular and flexible enclosure.

The electric cable 12 is connected at its lower end by a plug 51 to a cap 52 over the spherical bearing and the cable is held loose to prevent any counteraction thereof on the relative movements between the components of the suspension assembly.

The aforedescribed gyroscopic aiming system is used in connection with a drone 1 to properly aim it for launching. The level platform assembly and the upper end of the suspension assembly is installed by plugging the connecting links 3 into appropriate sockets provided on the underside of the drone. The anchoring base is secured onto the ground by the spikes 27 such that the baseplate 26 is level as can be checked with the gas bubble levels 28 and 29. The post 30 then stands upright or nearly so. The level platform assembly is also adjusted by the screws 8 to level the reference platform 6, as nearly as possible. The lower end portion of the suspension assembly is then put in place by engaging the suspension cables in the ends 17 and 22 of the upper and lower suspension members 13 and 20. The lower member 20 is engaged on the upright pivot 30 with the sleeve 25 slidable along that pivot.

Before the aforementioned installation of the anchoring base and of the lower end member 20, the drone 1 is approximately aimed by rotating it in azimuth until the compass 10 indicates the desired aiming angle relative to Magnetic North. After the level reference platform 6 has been levelled, upper member 13 is rotated to read a given angle on the scale. This given angle consists of the algebraic sum of the required aiming angle with respect to Georgraphic North and a known detent error because the scale can only be set in regularly spaced detents which represent round members like every 2°. The upper member 13 is then approximately aimed such that the right hand leg 16 in FIG. 2 points in the East direction. The deviation in this East aiming of the leg consists of the sum of the original deviation in the drone aiming by means of the magnetic compass and the known detent error, also called rounding off error.

If now the lower member 20 is suspended from the upper member 13 by means of the three cables 18, then the gyroscopic assembly 33 is also directed such that the input axis of the gyroscopic unit is in line with the East direction except for the original aiming deviation and the known detent error.

The gyroscopic unit can then measure its East deviation angle. This deviation is then corrected for the known detent error and the result is the drone aiming deviation. This aiming deviation may be used to initially correct the drone aiming directly on the site or to feed a correction signal to the azimuth control of the drone, such that directly after launch the drone will correct its launch direction for the given correction signal.

It must be pointed out that the double pendulous suspension provided by the pivots 41 and 42 is provided to achieve fine levelling or spatial stability of the gyroscope unit. This is achieved by the massive housing 38 achieving a fairly good relative suspension by pivoting of the pivots 42 in the bearings 43 such that the flexural pivot 41 need to pivot only slightly within the inherent limit of possible angular deflection thereof to avoid damaging the spring in it.

What is claimed is:

1. A gyroscopic aiming system for a navigable body comprising a connection device removably securable to said body, a level platform assembly joined to said connection device and including a level reference platform, a gyroscopic assembly having a gyroscopic input axis operatively pointing approximately in the East direction, a suspension assembly having an upper end rotatively connected to said level reference platform and angularly settable in azimuth relative to the latter for bodily rotation in azimuth therewith and a lower end pivotally suspending said gyroscopic assembly and rotatively restraining the latter in azimuth relative to said upper end, an anchoring base fixedly securable relative to the ground and including a pivot connection operatively engaging said lower end, laterally restraining the latter, and constructed and arranged for azimuth rotation and pitch and roll pivoting of said lower end, and an azimuth direction indicator assembly operatively associated to said upper end portion and said level reference platform and indicating the relative azimuth aiming directions of said level reference platform, navigable body, and suspension assembly whereby deviation of the navigable body from the predetermined azimuth aiming direction produces azimuth deviation of the input axis of the gyroscopic assembly from the East direction and measurement of said deviation by the gyroscopic assembly for corresponding correction of the aiming direction of the navigable body.

2. A gyroscopic aiming system as defined in claim 1, wherein said gyroscopic assembly is pendulously pivoted to the lower end of the suspension assembly about a pair of axes extending parallel and orthogonal respectively to the input axis and is rotatively restrained to said lower end for rotation in azimuth therewith and with said upper end.

3. A gyroscopic aiming system as defined in claim 2, wherein said gyroscopic assembly includes a ballasted pendulous carrier and a gyroscopic unit, the carrier being pendulously pivoted to the lower end of the suspension assembly about said pair of axes and is rotatively restrained to said lower end for rotation in azimuth therewith and with said upper end, and the gyroscopic unit being pendulously pivoted to said carrier about an axis extending parallel to said gyroscope input axis and substantially in alignment with one axis of said pair of axes of the carrier.

4. A gyroscopic aiming system as defined in claim 3, wherein said carrier constitutes a housing, said gyroscopic unit is pivotally mounted in said housing with a damping fluid filling the space in said housing around the gyroscopic unit, and said pivot connection provides a pivot center for said pitch and roll pivoting positioned substantially at the level of said pivot axis for the gyroscopic unit.

5. A gyroscopic aiming system as defined in claim 1, wherein said anchoring base includes a damping system operatively connected to said lower end and damping the latter in the azimuth rotation thereof.

6. A gyroscopic aiming system as defined in claim 5, wherein the pivot connection includes an upright pivot and a sleeve bearing axially displaceable along the upright pivot and said lower end includes a spherical ball bearing assembly connected to said sleeve bearing and providing said azimuth rotation and pitch and roll pivoting of the lower end relative to said sleeve bearing and upright pivot.

7. A gyroscopic aiming assembly as defined in claim 1, wherein said upper end includes an upper revolving support, said lower end includes a lower revolving support and suspension links suspending said lower revolving support from said upper revolving support, said pivot connection is operatively connected to said lower revolving support, said gyroscopic assembly is pivotally suspended to said lower support and rotatable therewith in azimuth on said anchoring base.

8. A gyroscopic aiming system as defined in claim 7, wherein said links constitute cables removably and adjustably connected to said upper and lower revolving supports.

9. A gyroscopic aiming assembly as defined in claim 1, wherein said azimuth direction indicator assembly includes a North seeking device operatively connected to said level reference platform and bodily rotating therewith to operatively indicate the azimuth aiming direction thereof and of the navigable body.

10. A gyroscopic aiming system as defined in claim 4, wherein said anchoring base includes a damping system operatively connected to said lower end and damping the latter in the azimuth rotation thereof, the pivot connection includes an upright pivot and a sleeve bearing axially displaceable along the upright pivot, said lower end includes a spherical ball bearing assembly connected to said sleeve bearing and providing said azimuth rotation and said pitch and roll pivoting of the lower end relative to said sleeve bearing and upright pivot, said upper end includes an upper revolving support, said lower end includes a lower revolving support and suspension links suspending said lower revolving support from said upper revolving support, said pivot connection is operatively connected to said lower revolving support, said gyroscopic assembly is pivotally suspended to said lower support and rotatable therewith in azimuth on said anchoring base, said links constitute cables removably and adjustably connected to said upper and lower revolving supports, and said azimuth direction indicator assembly includes a magentic compass operatively connected to said level reference platform and bodily rotating therewith to operatively indicate the azimuth aiming direction thereof and of the navigable body.

11. A gyroscopic aiming system as defined in claim 1, 4, or 10, wherein the level platform assembly includes a first levelling support pivoted to said level reference platform about a first predetermined axis relative to said navigable body and a second levelling support pivoted to said first levelling support about a second predetermined axis extending orthogonally relative to said first predetermined axis, said first and second axes extend parallel to the roll and pitch axes respectively of the navigable body, and a level indication device and a level adjustment device are operatively connected to said level reference platform and levelling supports and cooperatively define the level position of the level reference platform.

12. A gyroscopic aiming system as defined in claim 1, 4, or 10, wherein said connection device includes plugging members fixedly secured to said level platform assembly and removably plugging to said navigable body.

13. A gyroscopic aiming system as defined in claim 10, further including a flexible tubular enclosure operatively extendable around said level reference platform, said suspension assembly and said gyroscopic assembly, connected to said connection device and to said anchoring base, and operatively shielding said platform, suspension assembly, and gyroscopic assembly upon extension around the same.

14. A gyroscopic aiming system as defined in claim 13, further including telescopic posts operatively connected to said connection device and to said anchoring base and operatively and cooperatively forming a supporting framework laterally restraining said flexible tubular enclosure.

15. A gyroscopic aiming system as defined in claim 14, wherein said flexible tubular enclosure includes an upper collapsible tubular enclosure section and a lower collapsible tubular enclosure section, the upper tubular enclosure section has an upper end fixedly secured to said connection device and a first ring fixed to the lower end thereof, the lower tubular enclosure section has a lower end fixedly secured to said anchoring base and a second ring fixed to the upper end thereof, said telescopic posts include a set of upper telescopic posts and a set of lower telescopic posts positioned interiorly of the upper and lower enclosure sections respectively, the upper telescopic posts have an upper end pivotally secured to said connection device and are laterally pivotable in any lateral direction, the lower telescopic posts have a lower end pivotally secured to the anchoring base and are laterally pivotable in any lateral direction, each of the upper telescopic posts has a lower end fixed to the first ring, each of the lower telescopic posts has an upper end fixed to the second ring, and the first and second rings are releasably and selectively securable to each other intermediate said connection device and the anchoring base.

16. In an aiming system for a navigable body, a suspension system comprising a connection device removably securable to said body, a level platform assembly joined to said connection device and including a level reference platform, a suspension assembly having an upper end rotatively connected to said level reference platform and angularly settable in azimuth relative to the latter for bodily rotation in azimuth therewith and a lower end pivotally suspended from said upper end and rotatively restrained in azimuth relative to said upper end, an anchoring base fixedly securable relative to the ground and including a pivot connection operatively engaging said lower end, laterally restraining the latter, and constructed and arranged for azimuth rotation and pitch and roll pivoting of said lower end, and an azimuth direction indicator assembly operatively associated to said upper end portion and said level reference platform and indicating the relative azimuth aiming directions of said level reference platform, navigable body, and suspension assembly whereby deviation of the navigable body from the predetermined azimuth aiming direction produces equal azimuth deviation of the upper and lower ends of the suspension assembly and measurement of said deviation of the lower end allows corresponding correction of the aiming direction of the navigable body.

17. In an aiming system and suspension system as defined in claim 16, wherein said upper end includes an upper revolving support, said lower end includes a lower revolving support and suspension links suspend said lower revolving support from said upper revolving support, and said pivot connection is operatively connected to said lower revolving support, and operatively produces the lateral restraining thereof and allows pendulous rotation of the lower end about the pivot connection.

18. In an aiming system and suspension system as defined in claim 17, wherein said links constitute cables removably and adjustably connected to said upper and lower revolving supports.

19. In an aiming and suspension system as defined in claim 18, wherein the pivot connection includes an upright pivot and a sleeve bearing axially displaceable along the upright pivot and said lower end includes a spherical ball-bearing assembly connected to said sleeve bearing and providing said azimuth rotation and pitch and roll pivoting of the lower end relative to said sleeve bearing and upright pivot.

* * * * *